US008926838B2

(12) United States Patent
Stoermann

(10) Patent No.: US 8,926,838 B2
(45) Date of Patent: Jan. 6, 2015

(54) METHOD FOR RECOVERING SUSPENDED SOLIDS FROM RESIDUAL EFFLUENTS

(75) Inventor: Mark Stoermann, Wheatfield, IN (US)

(73) Assignee: Environmental Stewardship Solutions, Wheatfield, IN (US)

( * ) Notice: Subject to any disclaimer, the term of this patent is extended or adjusted under 35 U.S.C. 154(b) by 248 days.

(21) Appl. No.: 12/028,804

(22) Filed: Feb. 9, 2008

(65) Prior Publication Data

US 2008/0190859 A1 Aug. 14, 2008

Related U.S. Application Data

(60) Provisional application No. 60/900,526, filed on Feb. 9, 2007.

(51) Int. Cl.
| | |
|---|---|
| C02F 1/24 | (2006.01) |
| B03D 1/14 | (2006.01) |
| C02F 1/52 | (2006.01) |
| B01D 21/01 | (2006.01) |
| B01D 21/08 | (2006.01) |
| B01D 21/24 | (2006.01) |
| C02F 1/56 | (2006.01) |
| C02F 101/32 | (2006.01) |
| C02F 103/20 | (2006.01) |
| C02F 103/32 | (2006.01) |

(52) U.S. Cl.
CPC ............ C02F 1/5236 (2013.01); B03D 1/1462 (2013.01); B03D 1/1493 (2013.01); B03D 1/1456 (2013.01); B01D 21/01 (2013.01); B01D 21/08 (2013.01); B01D 21/2411 (2013.01); B01D 21/2433 (2013.01); C02F 1/24 (2013.01); C02F 1/56 (2013.01); C02F 2101/325 (2013.01); C02F 2103/20 (2013.01); *C02F 2103/32* (2013.01); *C02F 2301/026* (2013.01); *Y02E 50/343* (2013.01)
USPC ...................... 210/221.2; 210/512.1; 210/705; 210/707

(58) Field of Classification Search
USPC ............ 210/704, 705, 706, 707, 221.2, 512.1
See application file for complete search history.

(56) References Cited

U.S. PATENT DOCUMENTS

| | | | |
|---|---|---|---|
| 3,963,624 A | 6/1976 | Henderson et al. | ........... 210/521 |
| 3,977,970 A * | 8/1976 | Willis et al. | ................... 210/703 |

(Continued)

FOREIGN PATENT DOCUMENTS

| | | | |
|---|---|---|---|
| WO | WO 9208533 A1 * | 5/1992 | |
| WO | WO 02074440 A1 * | 9/2002 | |

OTHER PUBLICATIONS

International Search Report for International Application No. PCT/US08/53524.

*Primary Examiner* — Thomas M Lithgow
(74) *Attorney, Agent, or Firm* — Winstead PC

(57) ABSTRACT

A process for the treatment of contaminated fluid and wastewater containing residuals from food processing and waste and residuals from animal feeding operations and effluent from the digestion of these residuals is disclosed. The process is carried out in an enclosed tank using a separation procedure that maintains the state of the separated solids in the same state as they were upon introduction to the system, i.e., aerobic, anaerobic or anoxic, based on the condition of the solids upon introduction to the system. The system utilizes rotary flow instead of rakes to harvest the solids from the effluent. The process has applications in the recovery of emulsion in wastewater treatment and the operation of digesters for re-feeding to the digester.

3 Claims, 2 Drawing Sheets

(56) References Cited

U.S. PATENT DOCUMENTS

| | | | | |
|---|---|---|---|---|
| 4,094,783 A | * | 6/1978 | Jackson | 210/703 |
| 4,738,784 A | * | 4/1988 | Sugihara | 210/705 |
| 5,320,750 A | * | 6/1994 | Krofta | 210/221.2 |
| 5,382,358 A | * | 1/1995 | Yeh | 210/194 |
| 5,900,154 A | * | 5/1999 | Henriksen | 210/703 |
| 6,749,757 B2 | * | 6/2004 | Smith et al. | 210/703 |
| 2003/0146523 A1 | | 8/2003 | Morse et al. | 261/79.2 |
| 2003/0173288 A1 | | 9/2003 | Arnaud et al. | 210/512.1 |
| 2004/0069724 A1 | | 4/2004 | Morse et al. | 210/788 |
| 2004/0099607 A1 | | 5/2004 | Leffler et al. | 210/704 |
| 2005/0242000 A1 | * | 11/2005 | Khan et al. | 209/164 |

* cited by examiner

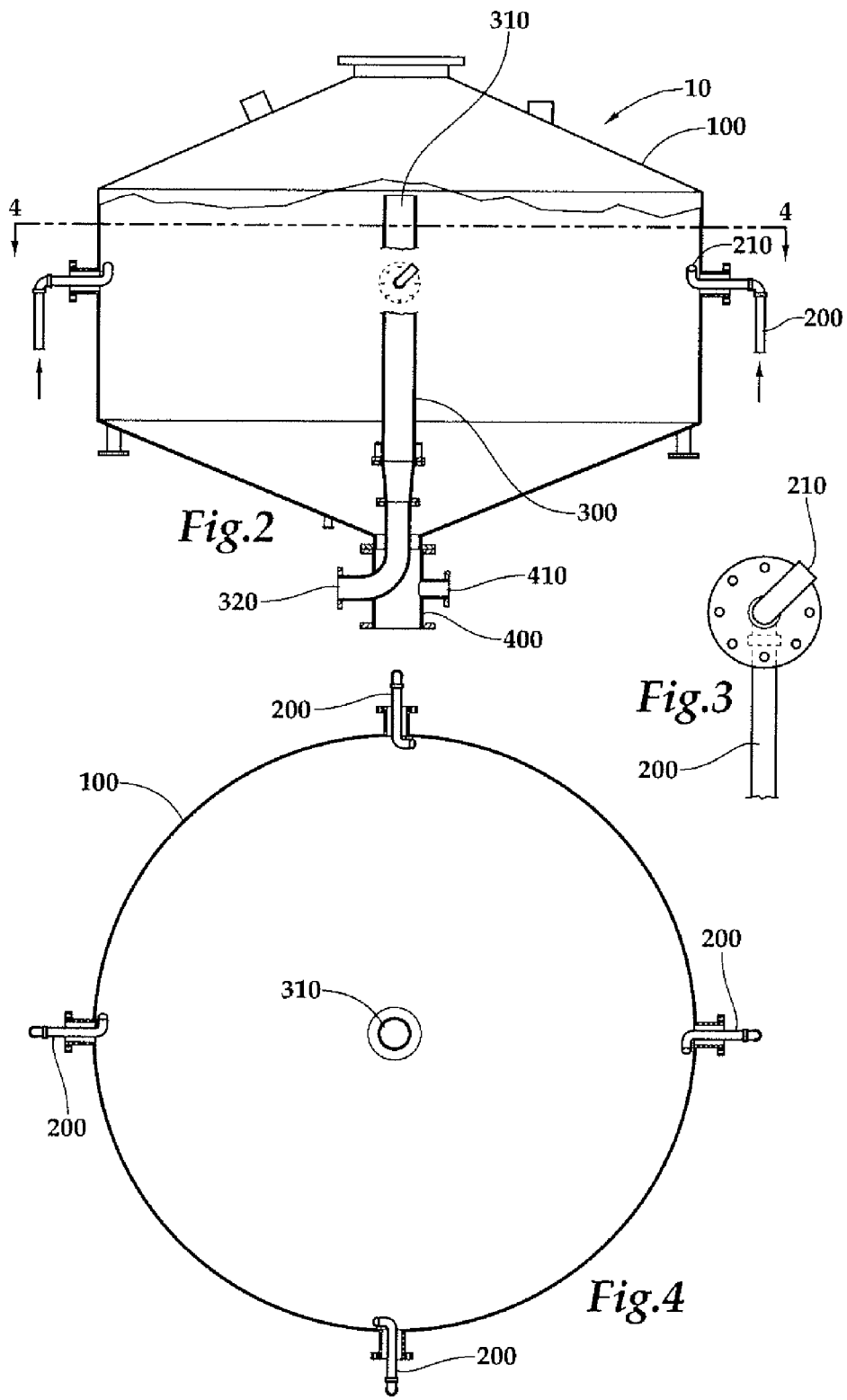

METHOD FOR RECOVERING SUSPENDED SOLIDS FROM RESIDUAL EFFLUENTS

CROSS REFERENCES TO RELATED APPLICATIONS

This application claims the benefit of U.S. Provisional Application 60/900,526, filed Feb. 9, 2007.

FIELD OF THE INVENTION

The invention that is the subject of this application pertains to the treatment of wastewater. Specifically, the invention is a solids and nutrient recovery system for applications that require partitioning of the solid and liquid phases of effluents from food processing residuals and waste, residuals from animal feeding operations and, the effluent from the digestion of these residuals. Specific applications for the invention include without limitation, the separation of suspended solids from the effluent of anaerobic digesters where the separation may be driven by a gas other than ambient air or where the suspended solids are of a fragile or delicate nature that will be disturbed by mechanical removal methods. The recovered suspended solid emulsion may be used as a substrate for feeding or re-feeding of digesters for the generation of biogas for power generation or continue to other processes.

BACKGROUND OF THE INVENTION

The separation of solids and liquids is the basis of all wastewater treatment. Generally the separation involves a first mechanical step and then proceeds to a more aggressive phase separation prior to final treatment, i.e., after some type of mechanical separation, the next step in wastewater treatment is the recovery of the suspended solids or emulsion that exist in the particle range between settable solids and dissolved solids. A generally acceptable method for this separation is the use of a dissolved air floatation device. In this device, the liquid to be separated is treated with chemicals following which, fine bubbles in the range of 10 to 20 microns are introduced to the effluent stream. The effluent is then directed to an open tank where separation can occur. The float or suspended solid emulsion rises to the top of the tank and is swept off the top of the residual effluent with a mechanical rake or other collection means. The result is a clear or generally clear effluent and a concentrated emulsion.

Unfortunately, the method described above is not suitable for the separation of delicate or fragile emulsions where it is desired to cause the separation with something other than ambient air or where it is required to maintain anaerobic conditions of the emulsion. This is specifically applicable in the event that the emulsion is to be re-injected into an anaerobic digester for further use and processing.

There is therefore a need for a wastewater treatment method that is suitable for use with delicate or fragile emulsions, and is also compatible for use under anaerobic conditions.

SUMMARY OF THE INVENTION

An embodiment of the invention provides an apparatus for the treatment of a contaminated fluid comprising, an integral tank; a means for introducing a mixture of suspended solids and a contaminated fluid into the tank; a means for collecting suspended solids that float to the surface of the mixture; a means for permitting decontaminated fluid to be removed from the tank; and a means for permitting the suspended solids to be removed from the tank.

A further embodiment of the invention provides a method for treating a contaminated fluid comprising the steps of introducing at least one additive to the contaminated fluid to form a mixture, wherein the contaminated fluid comprises suspended solids; imparting an electrical charge to the suspended solids; treating the mixture with gas; introducing the gas-treated mixture into a flocculation apparatus; causing the suspended solids in the treated mixture form a flocculant mass; introducing the treated mixture into a separation apparatus; and separating the suspended solids from the remainder of the mixture.

BRIEF DESCRIPTION OF THE DRAWINGS

The description herein refers to the accompanying drawings:

FIG. 2 is a schematic of an apparatus used in an embodiment of the invention;

FIG. 3 is a detailed drawing of a portion of the apparatus used in an embodiment of the invention; and FIG. 4 is a transverse cross-section of the apparatus shown in FIG. 2 along the plane designated by "4",

DESCRIPTION OF EXEMPLARY EMBODIMENTS

Figure 1:
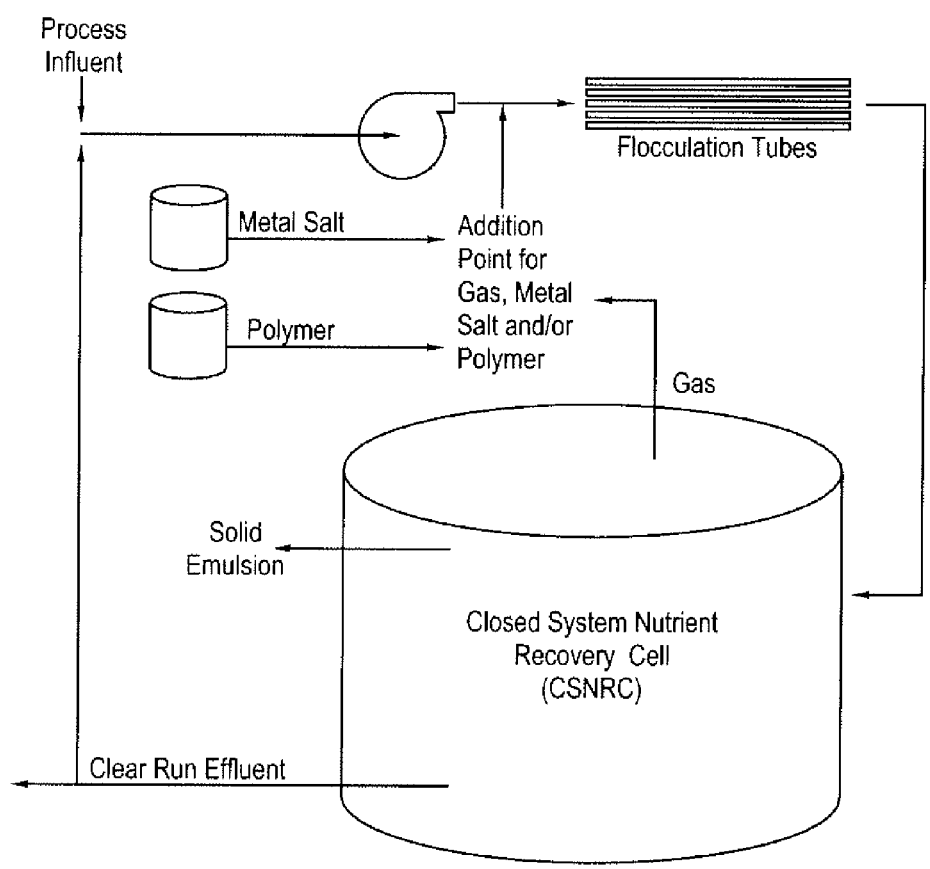
FIG. 1 is a process diagram showing an embodiment of the invention.

Embodiments of the invention presented herein are predicated on the need to separate the phases of wastewater between clear liquid and the suspended solid emulsion for the purpose of further downstream treatment of the emulsion. In certain embodiments of the invention the emulsion substrate may be recovered where the suspended solids are too delicate or fragile for mechanical harvesting. In certain embodiments of the invention, the further downstream treatment of the suspended solid emulsion may include the anaerobic digestion of the emulsion for generation of biogas energy or introduction into a pipeline.

An embodiment of the claimed invention provides an improvement over the process discussed in the prior art, and is directed to a method that continually separates a solid emulsion phase from a liquid effluent without using any mechanical harvesting methods.

In an embodiment of the invention, the specific application utilizes a cylindrical, closed integral tank in which a horizontal rotation is imparted to the effluent with a center weir and biogas from an anaerobic digester. By utilizing the rotary flow and the center weir, the process does not require the rake collection system for harvesting the suspended solids usually encountered in prior art wastewater systems.

In an embodiment of the invention, the center weir serves as a barrier or dam that serves as a collection point for the suspended solids present in the effluent. The center weir comprises an opening at its top, internal end, i.e., the end that is located within the interior of tank. The opening within the center weir permits the suspended solids that contact the weir to pass into the opening and exit the tank.

In the inventive process, the contaminated fluid or process influent to be treated, is first conveyed through process piping and is initially treated with one or more additives. In certain embodiments of the invention, the additive is a salt, a polymer or a combination of the two. The treatment of the effluent with the additive places a charge on the suspended solids present in the contaminated fluid.

Reference will now be made in detail to an embodiment of the present invention, an example of which is illustrated in the accompanying drawings With reference to FIG. 1, which provides a flow diagram of the inventive process, the contaminated fluid or process influent to be separated is first treated with a salt, polymer or combination to form a treated fluid mixture. Next, dissolved gas or gas bubbles are introduced into the treated fluid mixture, at which time the treated fluid mixture is directed to the flocculation apparatus. At the flocculation apparatus, a polymer, salt or a combination is added to the mixture with the intent of using the detention time in the flocculation tube to flocculate or mass the suspended solids into an emulsion before release of the treated mixture into a tank for separation.

In an embodiment of the invention, the gas bubbles that are introduced into the treated fluid mixture comprises ambient air. In a further embodiment of the invention, the gas bubbles that are introduced into the treated fluid mixture comprise gases that are generated during the production of the contaminated fluid, i.e., the gases are inherent to the contaminated fluid.

Within the tank, the treated fluid mixture separates into a solid emulsion and a liquid effluent. The gas bubbles draw the solid emulsion as a float to the top of the tank where it comes in contact with the center weir. With the round tank and design and positioning of the inlets that discharge the treated fluid mixture into the tank, rotary flow is imparted to the effluent causing the float to gather in the center of the tank at the weir. At this point, the float will exit the closed tank through the opening in the center weir. The clear run effluent is drawn from the bottom of the tank.

The invention presents an improvement over prior art systems because of the rotary flow imparted to the effluent, and the recovery of the residual emulsion while maintaining it in the state it was generated, i.e., aerobic, anaerobic or anoxic utilizing either ambient air or a gas which maybe part of the process by which the contaminated fluid was generated. The micro bubbles that are formed during the process of generation of the contaminated fluid, or as a result of introduction of ambient air, lifts the solid emulsion from the treated wastewater leaving a clear run effluent. Furthermore, the rotary flow design removes the need for recovery rakes or other mechanical means and thereby diminishes the possibility for explosion when motors for rake operation fail in a closed recovery system.

In an embodiment of the invention, the recovered solid emulsion is removed for further processing including the generation of biogas for energy or use as fertilizer. In situations where the solid emulsion is further processed by anaerobic digestion or other methods, the wastewater or contaminated fluid generated from this process can be treated in accordance with embodiments of the invention.

The treated fluid mixture to be separated may contain any type of solid suspension or residual from the processing or treatment of food or residual from the confined feeding operation of animals including dairy, fowl, or hogs. The contaminated fluid may also be from the anaerobic digestion of these same residuals.

Following the treatment of the contaminated fluid or process influent with one or more additives, the solids present in the contaminated fluid are now preferentially treated or prepared for the addition of micro bubbles of gas which may be either ambient air or a gas which was generated as part of the process that created the contaminated fluid. The electrical charge that results from the treatment of the contaminated fluid with an additive, causes the micro gas bubbles to become electrically connected to the suspended solids. Without being bound by any particular theory, this ability to utilize either ambient or co-generated gas is significant in that the recovered solid emulsion is therefore not altered and may be re-utilized without the addition of foreign gases.

In an embodiment of the invention, the suspended solid emulsion is chemically treated with an additive and micro gas bubbles from a desired source, following which the gas bubbles are connected to the solids. Next, a second additive is added to the gas-treated mixture. In an embodiment of the invention, the second additive is a polymer, or in cases where a polymer was used as an additive during the initial treatment, a second differently charged polymer, is added to the effluent and the entire flow is introduced to a flocculation apparatus (FIG. 1). In certain embodiments of the invention, the flocculation apparatus comprises a plurality of flocculation tubes.

In certain embodiments of the invention, the entire flow of treated fluid is provided with recycle flow upon entry into the flocculation tubes, which provides the solids in the effluent the opportunity to further flocculate or mass together and become a "float". This float, due to the chemical treatment, has a very low affinity for water and will rise, if given the opportunity.

The treated mixture in the flocculation tubes is now prepared to separate. The solid emulsion in the treated mixture is chemically altered following treatment with additives. Additionally, gas bubbles are attached to the solid emulsion. At this point the emulsion can rise to the surface when placed in the appropriate type of tank.

With reference to FIG. 2, the apparatus 10 for the separation of the suspended solids from the liquid effluent in the contaminated fluids may comprise a single integral tank 100 with a plurality of inlets 200 for fluids to enter the tank 100. In an embodiment of the invention, the system is designated as the Closed System Nutrient Recovery Cell, (CSNRC).

In an embodiment of the invention, the treated fluid mixture is introduced into a cylindrical tank 100 tangentially through a plurality of inlet headers 200. The direction of flow of the treated fluid mixture into the tank is shown by arrows in FIG. 2. The flow of the fluid treated mixture is designed to maintain constant flow at the outer circumference of the tank and impart a circular flow inside the tank (FIGS. 2 and 4). Once the treated fluid mixture is released to the tank, it separates with the float rising to the top of the tank. The float, through the rotation motion generated by the inflow of the treated fluid mixture through the inlets and the lift created by the gas bubbles, flows to the center of the tank where it falls into the opening 310 at the top of the center weir 300. The solid float material is subsequently removed from the tank through an outlet 320 located at the bottom, external end of the center weir 300. The clear run effluent that remains in the tank after the solid emulsion has floated out, is recovered through an outlet 410 at the base of the tank 400.

The inlet headers through which the treated fluid mixture is introduced into the tank, are designed such that the mixture enters the tank at an angle. As shown in FIG. 3, the portion of the inlet header 210 located within the tank is positioned at an angle relative to the portion of the inlet 200 outside the tank. The angled design of the inlet header 210 imparts a rotational flow to the treated fluid mixture upon its entry into the tank. The continued rotational flow of the mixture inside the tank in conjunction with the attachment of the micro gas bubbles to the emulsion of suspended solids causes the float to rise to the top of the tank, in accordance with the invention.

In an embodiment of the invention, effluents having solids concentrations on the order of 3 to 3.5% by weight are reduced to 0.5% to 0.75% by weight solids after treatment by the processes of the invention.

While the invention has been described in connection with what is presently considered to be the most practical and preferred embodiment, it is to be understood that the invention is not to be limited to the disclosed embodiments but, on the contrary, is intended to cover modifications and equivalent arrangements included within the spirit and scope of the appended claims, which scope is to be accorded the broadest interpretation so as to encompass all such modifications and equivalent as is permitted under the law.

What is claimed is:

1. An apparatus for the treatment of a contaminated fluid comprising,
    a closed integral tank (100);
    a means (200) for introducing a mixture of suspended solids and a contaminated fluid into the tank which comprises a plurality of inlets arranged around the perimeter of the tank (100), wherein the portion of the inlet located inside the tank (100) is positioned at an angle that is non-perpendicular relative to the portion of the inlet located outside the tank (100), wherein a rotary flow is imparted to the mixture within the tank (100);
    a means (310) for collecting the suspended solids that float to the surface of the mixture having an inlet inside the tank (100) and an outlet outside the tank (100), wherein the weir is located within the center of the tank (100), wherein said suspended solids float due to gas bubbles of a gas introduced into the contaminated fluid prior to the introduction of the mixture into the tank (100);
    a means (410) for permitting decontaminated liquid to be removed from the tank;
    a means (320) for permitting the suspended solids to be removed from the tank without mechanical harvesting; and
    a central weir that serves as a barrier or collection point for collecting the suspended solids, the central weir having an opening at its top that permits the suspended solids to pass into the opening and exit the tank without a mechanical collection system, wherein
    the tank (100) is a closed system;
    the means (200) are used for the purpose of introducing the mixture of suspended solids and a contaminated fluid into the tank (100), the means (320) are used for permitting the solid residuals to be removed from the tank (100) and the means (410) are used for the removal of decontaminated liquid from the tank (100),
    the tank (100) contains no other inlet other than means (200) and no outlet other than means (320) and means (410),
    the means (410) and means (320) are located at the center of the bottom, external end of the tank (100), and
    the decontaminated liquid is not recycled back to the tank.

2. The apparatus according to claim 1, wherein the means (410) for permitting decontaminated fluid to exit the tank comprises a first outlet.

3. The apparatus according to claim 1, wherein the means (320) for permitting the solid residuals to be removed from the tank comprises a second outlet.

* * * * *